(12) United States Patent
Wakamatsu et al.

(10) Patent No.: US 8,158,554 B2
(45) Date of Patent: Apr. 17, 2012

(54) HIGH HEAT-RESISTANT CATALYST AND MANUFACTURING METHOD THEREOF

(75) Inventors: Hironori Wakamatsu, Yokohama (JP); Masanori Nakamura, Yokosuka (JP); Masahiro Takaya, Yokosuka (JP); Katsuo Suga, Yokohama (JP); Hiroto Kikuchi, Hiratsuka (JP); Jun Ikezawa, Yokosuka (JP)

(73) Assignees: Nissan Motor Co., Ltd., Yokohama-shi (JP); RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 12/596,578

(22) PCT Filed: Apr. 17, 2008

(86) PCT No.: PCT/JP2008/057489
§ 371 (c)(1),
(2), (4) Date: Oct. 19, 2009

(87) PCT Pub. No.: WO2008/133168
PCT Pub. Date: Nov. 6, 2008

(65) Prior Publication Data
US 2010/0113262 A1    May 6, 2010

(30) Foreign Application Priority Data

Apr. 20, 2007 (JP) .................................. 2007-112311
Feb. 28, 2008 (JP) .................................. 2008-048166

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ......... 502/326; 502/252; 502/258; 502/259; 502/261; 502/263; 502/303; 502/327; 502/328; 502/332; 502/333; 502/334; 502/336; 502/338; 502/339; 502/340; 502/341; 502/349; 502/355; 502/407; 502/439

(58) Field of Classification Search .................. 502/252, 502/258, 259, 261, 262, 263, 303, 326–328, 502/332–334, 336, 338, 339, 340, 341, 349, 502/355, 407, 415, 439
See application file for complete search history.

(56) References Cited

U.S. PATENT DOCUMENTS 7,585,811 B2 * 9/2009 Nakamura et al. ............ 502/327
(Continued)

FOREIGN PATENT DOCUMENTS

JP        8-131830 A    5/1996
(Continued)

OTHER PUBLICATIONS

Japanese Patent Application No. 2005-318370, filed Nov. 1, 2005, 19 pgs.

*Primary Examiner* — Cam N. Nguyen

(74) *Attorney, Agent, or Firm* — Foley & Lardner LLP

(57) ABSTRACT

A high heat-resistant catalyst includes: noble metal particles; first compounds which contact the noble metal particles and suppress movement of the noble metal particles; and second compounds which envelop the noble metal particles and the first compounds, suppress the movement of the noble metal particles, and suppress coagulation of the first compounds following mutual contact of the first compounds. The first compounds support the noble metal particles, and single piece or aggregate of the first compounds supporting the noble metal particles are included in a section partitioned by the second compounds. A coefficient of linear thermal expansion of the second compounds is $1.2 \times 10^{-5}$ $[K^{-1}]$ or less.

8 Claims, 1 Drawing Sheet

U.S. PATENT DOCUMENTS

| | | | |
|---|---|---|---|
| 7,601,670 B2 * | 10/2009 | Yasuda et al. | 502/326 |
| 7,605,108 B2 * | 10/2009 | Wakamatsu et al. | 502/326 |
| 7,674,744 B2 * | 3/2010 | Shiratori et al. | 502/327 |
| 7,713,908 B2 * | 5/2010 | Yamamoto et al. | 502/300 |
| 7,713,911 B2 * | 5/2010 | Wakamatsu et al. | 502/332 |
| 7,867,943 B2 * | 1/2011 | Takeshima | 502/327 |
| 2005/0014638 A1 | 1/2005 | Miura | |
| 2009/0111688 A1 | 4/2009 | Nakamura et al. | |

FOREIGN PATENT DOCUMENTS

| | | |
|---|---|---|
| JP | 2003-117393 A | 4/2003 |
| JP | 2005-000829 A | 1/2005 |
| JP | 2005-830 | 1/2005 |
| JP | 2005-034683 A | 2/2005 |
| JP | 2006-192357 A | 7/2006 |
| JP | 2007-795 A | 1/2007 |

* cited by examiner

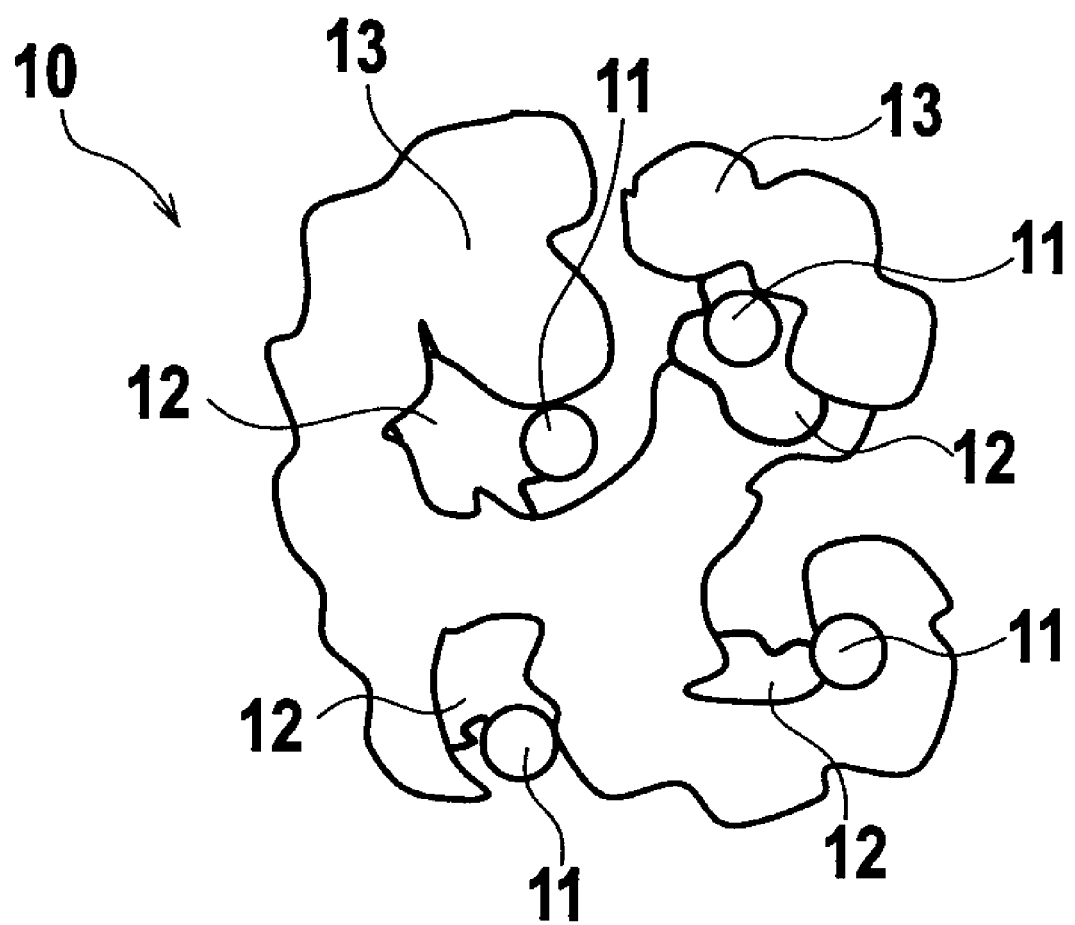

HIGH HEAT-RESISTANT CATALYST AND MANUFACTURING METHOD THEREOF

TECHNICAL FIELD

The present invention relates to a high heat-resistant catalyst suitable for application to treatment for purifying exhaust gas discharged from an internal combustion engine, and relates to a manufacturing method of the high heat-resistant catalyst.

BACKGROUND ART

In recent years, in order to remove harmful substances such as a hydrocarbon compound (HC), carbon monoxide (CO) and carbon nitride (NOx), which are contained in exhaust gas exhausting from an internal combustion engine, an exhaust gas purifying catalyst in which particles of noble metal such as platinum (Pt) are supported on a carrier of a metal oxide such as alumina ($Al_2O_3$) has been being widely used. In the conventional exhaust gas purifying catalyst, a large amount of such noble metal particles are used in order to enhance durability of the noble metal particles against variations of an ambient atmosphere. However, it is not desirable to use the large amount of noble metal particles from a viewpoint of protecting the earth's resources.

From such a background, an attempt has been recently made to enhance the durability of the noble metal particles in such a manner that transition metal such as cerium (Ce) and manganese (Mn), or a transition metal compound, which functions as an oxygen storage component (OSC) material, is disposed in the vicinity of the noble metal particles by an impregnation method, whereby the variations of such an atmosphere around the noble metal particles is suppressed by the transition metal or the transition metal compound (refer to Patent Citations 1 to 4). Note that, in accordance with the method as described above, enhancement of activity of the noble metal particles can also be expected in addition to the enhancement of the durability of the noble metal particles.

Patent Citation 1: Japanese Patent Unexamined Publication No. H08-131830
Patent Citation 2: Japanese Patent Unexamined Publication No. 2005-000829
Patent Citation 3: Japanese Patent Unexamined Publication No. 2005-000830
Patent Citation 4: Japanese Patent Unexamined Publication No. 2003-117393

DISCLOSURE OF INVENTION

In the case of suppressing the variations of the atmosphere around the noble metal particles by such compounds of the transition metal, it is necessary that both of the noble metal particles and particles of the compounds of the transition metal be microparticles and contact each other. However, in the case of using the impregnation method, the noble metal particles and such compound particles of the transition metal do not become the microparticles even if both thereof can be brought into contact with each other, or both cannot be brought into contact with each other or can be brought into little contact with each other even if both become the microparticles. Accordingly, it is difficult to arrange the compound particles of the transition metal in the vicinity of the noble metal particles as designed. Moreover, in the case of attempting the enhancement of the durability of the noble metal particles, it is desirable to set an average particle diameter of the noble metal particles at 2 [nm] or more. In addition, in the case of attempting the enhancement of the activity of the noble metal particles, it is desirable to set the average particle diameter of the noble metal particles at 5 [nm] or less. However, in the case of using the impregnation method, the average particle diameter of the noble metal particles becomes 1.5 [nm] or less, and it is difficult to expect the enhancement of the durability of the noble metal particles and the enhancement of the activity thereof.

Moreover, the compounds of the transition metal are prone to be solid-solved with alumina widely used as such a metal oxide carrier. Accordingly, it is difficult to obtain an effect of enhancing the activity of the noble metal particles only by arranging the compounds of the transition metal in the vicinity of the noble metal particles. Note that, in order to solve such a problem, a method of supporting the compounds of the transition metal on a carrier that is not solid-solved with the compounds of the transition metal is considered. However, in the case of using this method, the compounds of the transition metal move in a high-temperature atmosphere, and the compounds of the transition metal contact one another, whereby the compounds of the transition metal are coagulated. Moreover, in order to prevent such coagulation of the compounds of the transition metal, a method of producing compound particles of the transition metal, which have a large surface area, by using a reversed micelle method is considered. However, an organic solvent is used in this method, and accordingly, production cost and an environmental load are increased.

Furthermore, when an exhaust gas purifying catalyst is considered to be used under higher temperature than a conventional circumstance, a conventional exhaust gas purifying catalyst did not have sufficient heat resistance. For instance, in a catalyst in which noble metal particles are directly supported on a high heat-resistant carrier, the noble metal particles under such high temperature were coagulated while moving on a surface of the carrier. Accordingly, it made catalytic activity of the noble metal difficult to maintain in a super high temperature range. Moreover, in a catalyst provided with transition metal or a compound of the transition metal in the vicinity of noble metal particles by use of the impregnation method, the noble metal particles were easily coagulated with one another in an impregnation solution. Thus, durability of the catalyst was not sufficient. In addition, in a catalyst supporting noble metal particles on alumina, the noble metal particles supported on alumina were coagulated under high temperature, which resulted in lowering catalytic performance under such high temperature. Further, in a catalyst coating alumina particles supporting noble metal particles with ceria, ceria as a coating material did not have heat resistance. Accordingly, catalytic activity was not sufficient.

In order to solve the above-described problems, a high heat-resistant catalyst according to the present invention is summarized to include: noble metal particles; first compounds which contact the noble metal particles and suppress movement of the noble metal particles; and second compounds which envelop the noble metal particles and the first compounds, suppress the movement of the noble metal particles, and suppress coagulation of the first compounds following mutual contact of the first compounds, wherein the first compounds support the noble metal particles, and single piece or aggregate of the first compounds supporting the noble metal particles are included in a section partitioned by the second compounds, and a coefficient of linear thermal expansion of the second compounds is $1.2 \times 10^{-5}$ $[K^{-1}]$ or less.

Moreover, a manufacturing method of a high heat-resistant catalyst according to the present invention is summarized to include: preparing first compounds supporting noble metal particles, followed by milling them; and after the milling, forming second compounds on peripheries of the first compounds.

BRIEF DESCRIPTION OF DRAWINGS

FIG. 1 is a schematic view showing a configuration of a high heat-resistant catalyst serving as an embodiment of the present invention.

BEST MODE FOR CARRYING OUT THE INVENTION

A description will be made below of an embodiment of a high heat-resistant catalyst of the present invention while using the drawings.

FIG. 1 is a schematic view of the high heat-resistant catalyst serving as the embodiment of the present invention. A high heat-resistant catalyst 10 shown in this figure is composed of: noble metal particles 11 having catalytic activity; first compounds 12 which contact the noble metal particles 11 and suppress movement of the noble metal particles 11; and second compounds 13 which envelop the noble metal particles 11 and the first compounds 12, suppress the movement of the noble metal particles 11, and suppress coagulation of the first compounds 12 following mutual contact of the first compounds 12.

The first compounds 12 support the noble metal particles 11. Moreover, the first compounds 12 supporting the noble metal particles 11 are included in a section partitioned by the second compounds 13. The first compounds 12 are shown as single piece in the example shown in the figure, however, the first compounds 12 may be aggregate so that the several first compounds 12 are included in each section partitioned by the second compounds 13.

The high heat-resistant catalyst 10 serving as the embodiment of the present invention shown in FIG. 1 suppresses movement of the noble metal particles 11 by supporting the noble metal particles on the first compounds 12 that are a compound of transition metal, and by covering the noble metal particles 11 and the first compounds 12 with the second compounds 13. Also, the high heat-resistant catalyst 10 suppresses mutual coagulation of the first compounds 12.

Specifically, the high heat-resistant catalyst 10 shown in FIG. 1 brings the first compounds 12 into contact with the noble metal particles 11 so as to chemically bond the noble metal particles 11 and the first compounds 12, whereby the first compounds 12 act as an anchor agent of the chemical bonding and chemically suppress the movement of the noble metal particles 11. In addition, by covering the noble metal particles 11 and the first compounds 12 with the second compounds 13, the movement of the noble metal particles 11 is physically suppressed. Furthermore, the high heat-resistant catalyst 10 having a particle unit configuration composed of the noble metal particles 11, the first compounds 12 and the second compounds 13 includes the noble metal particles 11 and the first compounds 12 in the section partitioned by the second compounds 13, whereby the first compounds 12 are suppressed from coagulating caused by moving and contacting one another beyond the section partitioned by the second compounds 13. Consequently, coagulation of the noble metal particles 11 supported on the first compounds 12 is also suppressed.

For these reasons, the high heat-resistant catalyst 10 can prevent catalytic activity depression caused by coagulation of the noble metal particles 11 without increasing production cost and an environmental load, thereby maintaining an effect of enhancing the activity of the noble metal particles 11 by the first compounds 12. Therefore, it is possible to achieve the catalyst having excellent durability against variations of an atmosphere.

The applicant has applied for a patent with regard to the catalyst 10 having the structure shown in FIG. 1 (Description of Japanese Patent Unexamined Publication No. 2005-318370). Inventors have been advancing their researches since the patent application, and have been trying to improve durability of the catalyst under higher temperature. If an exhaust gas purifying catalyst can maintain catalytic activity sufficiently under super high temperature such as 1000° C. or more, it would be possible to purify exhaust gas by providing a honeycomb substrate formed by being covered with the exhaust gas purifying catalyst just under an exhaust manifold and further inside the exhaust manifold of a gasoline engine, and possible to achieve an early activation of the catalyst, whereby exhaust gas purifying property at a cold start and the like can be improved. Moreover, the exhaust gas purifying catalyst that has excellent heat resistance effectively contributes to improve exhaust gas purifying property when driving a vehicle at high speed.

Thus, the catalyst of the present invention is required to have the second compounds 13 of which a coefficient of linear thermal expansion is $1.2 \times 10^{-5}$ [$K^{-1}$] or less. Due to the second compounds 13 of which the coefficient of linear thermal expansion is $1.2 \times 10^{-5}$ [$K^{-1}$] or less, heat resistance of the catalyst that has a configuration to suppress the movement of the noble metal particles 11 and the mutual coagulation of the first compounds 12 is improved, and therefore, the catalyst can maintain sufficient catalytic activity in a super high temperature range. More specifically, due to the second compounds 13 of which the coefficient of linear thermal expansion is $1.2 \times 10^{-5}$ [$K^{-1}$] or less, the high heat-resistant catalyst of the present invention can suppress a change of the second compounds 13 caused by high temperature even under super high temperature of 1000° C. or more, and suppress the coagulation of the first compounds 12 supporting the noble metal particles 11. Consequently, it is possible to prevent the coagulation and deterioration of the noble metal particles 11. Furthermore, due to the second compounds 13 of which the coefficient of linear thermal expansion is $1.2 \times 10^{-5}$ [$K^{-1}$] or less, it is possible to maintain the above-mentioned catalyst configuration even under super high temperature of 1000° C. or more. Thus, it is possible to suppress the coagulation of the first compounds 12 supporting the noble metal particles 11, and consequently, possible to prevent the coagulation and deterioration of the noble metal particles 11.

For these reasons, the catalyst according to the present invention can maintain sufficient catalytic activity even under super high temperature of 1000° C. or more.

The catalyst according to the present invention preferably includes the second compounds 13 of which porosity is 30% or more. Due to the second compounds 13 of which the porosity is 30% or more, it is possible to obtain an effective gas contact between the noble metal particles 11 and reactant gas in the catalyst. Therefore, due to the second compounds 13 of which the porosity is 30% or more, it is possible to achieve the catalyst effect of the present invention capable of maintaining the noble metal in a state of particles in a high temperature range, and possible to take advantage of the sufficient catalytic activity. When the porosity of the second compounds 13 is less than 30%, it is difficult to obtain sufficient gas diffusion in the catalyst compared to the second compounds having the porosity with 30% or more.

The catalyst of the present invention including the second compounds 13 of which the porosity is 30% or more can be applied to an exhaust gas purifying catalyst such as a combustion catalyst. In addition, by enhancing reactivity with reactant gas, the catalyst can be also applied to a catalytic technology such as an oxygen sensor to improve functionality.

The catalyst according to the present invention preferably includes the second compounds 13 of which a BET specific surface area after a heat treatment at 1000° C. is 5 [m$^2$/g] or more. According to the researches of the inventors, it has been found that the second compounds 13, in heat-resistant materials, having 5 [m$^2$/g] or more of the BET specific surface area measured by a BET method after the heat treatment at 1000° C. is desirable. Due to the second compounds 13 of which the BET specific surface area after the heat treatment at 1000° C. is 5 [m$^2$/g] or more, heat resistance of the second compounds 13 can be reliably obtained. Thus, the catalyst of the present invention can maintain the secure catalytic activity under super high temperature of 1000° C. or more, thereby improving durability. Materials considered as a heat-resistant material of which BET specific surface areas are less than 5 [m$^2$/g] are inadequate as for the second compounds 13.

Due to the second compounds 13 required to have the coefficient of linear thermal expansion with $1.2 \times 10^{-5}$ [K$^{-1}$] or less and having porosity with 30% or more, it is possible to obtain the effective gas contact between the noble metal particles 11 and reactant gas in the catalyst. Therefore, due to the second compounds 13 of which the porosity is 30% or more, it is possible to achieve the catalyst effect of the present invention capable of maintaining the noble metal in a state of particles in a high temperature range, and possible to take advantage of the sufficient catalytic activity. When the porosity of the second compounds 13 is less than 30%, it is difficult to obtain sufficient gas diffusion in the catalyst compared to the second compounds having the porosity with 30% or more.

The catalyst of the present invention preferably includes the second compounds 13 that are an oxide of an element selected from Si, Al, Mg, Fe, Ca and Zr, or a composite compound including at least one of those elements. As for the second compounds, so-called high heat-resistant ceramics such as cordierite, mullite, SiC, α-alumina and silica can be used. In addition, the above-mentioned cordierite, mullite, SiC and α-alumina may include Fe, Ca and Zr as a composite component or as an impurity. Moreover, the second compounds 13 may be an oxide of the above-mentioned elements such as α-alumina and silica, or a composite compound including at least one of those elements. Further, the second compounds 13 are not limited to include only one kind of composite compounds. For instance, the second compounds 13 may include cordierite mixed with some of SiO$_2$. Even if the second compounds 13 include two kinds or more of those compounds, it is possible to maintain a fixed state of the first compounds 12 supporting the noble metal particles 11 similar to the second compounds 13 that include one kind of those compounds.

The catalyst of the present invention preferably includes the second compounds 13 that are an oxide of an element especially selected from Si, Al, La and Zr, or a composite compound including at least one of those elements, with regard to the oxide of the element selected from the above-mentioned Si, Al, Mg, Fe, Ca, La and Zr, or the composite compound including at least one of those elements. Due to the second compounds 13 that are the oxide of the element selected from Si, Al, La and Zr, or the composite compound including at least one of those elements, it is possible to obtain heat resistance required for the second compounds 13 in the catalyst of the present invention more reliably.

The catalyst of the present invention more preferably has the second compounds 13 of which the coefficient of linear thermal expansion is $2.0 \times 10^{-6}$ [K$^{-1}$] or less. As for the high heat-resistant ceramics of which the coefficient of linear thermal expansion is $2.0 \times 10^{-6}$ [K$^{-1}$] or less, cordierite is included, for instance. Due to the second compounds 13 of which the coefficient of linear thermal expansion is $2.0 \times 10^{-6}$ [K$^{-1}$] or less, it is possible to obtain an increased heat resistance effect. In addition, when the catalyst of the present invention is considered to be applied to an exhaust gas purifying catalyst, for instance, a cordierite honeycomb substrate coated with the exhaust gas purifying catalyst has a coefficient of linear thermal expansion with $1.8 \times 10^{-6}$ [K$^{-1}$]. Therefore, due to the second compounds 13 of which the coefficient of linear thermal expansion is $2.0 \times 10^{-6}$ [K$^{-1}$] or less, a difference of the coefficient of linear thermal expansion between the catalyst and the honeycomb substrate is small even in a super high temperature range. Thus, effects of lessening heat stress and preventing substrate breakage and catalyst layer exfoliation can be achieved.

The catalyst according to the present invention is not limited in kind of noble metal. When the catalyst according to the present invention is applied to an exhaust gas purifying catalyst, for instance, the noble metal can be at least one selected from Pt, Pd and Rh having catalytic activity to purify exhaust gas.

The catalyst according to the present invention is also not limited with regard to the first compounds 12. When the catalyst according to the present invention is applied to an exhaust gas purifying catalyst, for instance, the first compounds 12 can be a compound including one or two or more kinds of transition metal such as Ce and Zr.

Next, a description will be made of an embodiment of a manufacturing method of the above-described catalyst according to the present invention. In the embodiment of the manufacturing method, the first compounds 12 supporting the noble metal particles 11 are prepared first, followed by milling the supported first compounds 12. The method of supporting the noble metal particles 11 on the first compounds is no limited. For instance, the impregnation method can be used. The milling method after the preparation of the first compounds 12 supporting the noble metal particles 11 is also not limited. For instance, the first compounds 12 supporting the noble metal particles 11 can be dispersed in a solvent, followed by milling the dispersion liquid by a mill. By such a milling, it is possible to uniformly disperse the refined noble metal-supported first compounds 12 in raw materials of the second compounds 13 in the following step, and possible to easily manufacture the catalyst according to the present invention having a desired configuration.

The following step to provide the second compounds 13 on peripheries of the milled noble metal-supported first compounds 12 is performed. By this step, the second compounds 13 are formed covering the first compounds 12 supporting the noble metal particles 11 so as to have a configuration to include single piece or aggregate of the first compounds 12 supporting the noble metal particles 11 in the section partitioned by the second compounds 13. This step can be a step to mix slurry including the milled noble metal-supported first compounds 12 with slurry including the second compounds 13 or a precursor thereof, followed by drying and baking solid components of the mixed slurry. In addition, in the above-described step to form the second compounds 13, materials disappeared at high temperature, such as cellulose, can be mixed as necessary in order to adjust the porosity of the second compounds 13. The materials disappeared at high temperature are disappeared at baking, and areas occupied by the materials are to be pores.

In another embodiment of the manufacturing method of the catalyst according to the present invention, a step of preparing catalyst powder includes supporting the noble metal particles on the first compounds 12, milling and slurrying the second compounds 13, dispersing the first compounds 12 supporting the noble metal particles 11 in the slurry of the second compounds, followed by drying and baking so as to form the catalyst. The method supporting the noble metal particles 11 on the first compounds 12 is not limited. For instance, the impregnation method can be used. By slurrying the second compounds 13, the first compounds 12 supporting the noble metal particles 11 can be sufficiently dispersed. In the slurry, materials disappeared at high temperature, such as cellulose, can be mixed as necessary in order to adjust the porosity of the second compounds 13. The first compounds 12 supporting the noble metal particles 11 are dispersed in the slurry of the second compounds 13, followed by drying and baking so as to form the catalyst.

The following step of providing the catalyst powder obtained as described above on an inner surface of the substrate is performed. The catalyst powder is provided on the inner surface of the substrate so as to use for purifying exhaust gas. The catalyst coated on the inner surface of the substrate may be a single layer with a single catalyst, or multiple layers with a several kinds of catalysts. In the case of the multiple layers, it is difficult to obtain durability under high temperature such as 1000° C. or more if every catalyst layer does not adopt the catalyst according to the present invention.

EXAMPLES

Hereinafter, a description will be specifically made of the present invention based on examples.

Catalyst bodies in Examples 1 to 5 and Comparative Examples 1 and 2 shown in Table 1 were prepared. Hereinafter, a description will be made of the catalyst bodies in Examples and Comparative Examples.

and milled, whereby dispersed slurry with an average particle diameter of 150 nm was obtained.

Meanwhile, slurry liquid in which α-alumina with a primary particle diameter of 150 nm was milled was prepared. The slurry liquid and the first compound-dispersed slurry were mixed, and a predetermined amount of cellulose as a porous-forming material and aluminum hydroxide as a binder were put into the mixed liquid, followed by drying, compressing and molding, and baking at 1000° C., whereby a catalyst structure of Example 1 was obtained.

In this case, the noble metal support concentration of the catalyst was 0.1 wt %, the content of the first compounds was 24.9 wt %, and the content of alumina was 75 wt %.

Also, the coefficient of linear thermal expansion of this catalyst body between 1000° C. to 1100° C. and the porosity measured by the Archimedean method were as shown in Table 1.

Example 2

A catalyst body of Example 2 was obtained in a similar way to Example 1 except that $Ce_{0.8}Zr_{0.2}O_x$ was used as the first compounds instead of $CeO_2$ and a cordierite raw material formed by putting a predetermined amount of kaolin and talc was used instead of α-alumina.

Example 3

A catalyst body of Example 3 was obtained in a similar way to Example 2 except that the amount of cellulose to put into was doubled.

Example 4

A Pd nitrate solution was impregnated with and supported on $Zr_{0.7}Ce_{0.3}O_x$ so that a noble metal support concentration became 0.4 wt %, followed by drying and baking, whereby noble metal-supported first compounds of Example 4 were obtained.

TABLE 1

| | Noble Metal | First Compounds Material | Second Compounds | | Coefficient of Linear Thermal Expansion ($K^{-1}$) | Porosity (%) | Noble Metal Exposure Area After Heat Resistance Test At 1000° C. ($m^2$/g-Metal) |
| | | | Material | Including Element | | | |
|---|---|---|---|---|---|---|---|
| Example 1 | Pt | $CeO_2$ | α-Alumina | Al | $8.0 \times 10^{-6}$ | 44 | 11 |
| Example 2 | Pt | $Ce_{0.8}Zr_{0.2}O_2$ | Cordierite | Mg, Al, Si, O | $1.8 \times 10^{-6}$ | 29 | 18 |
| Example 3 | Pt | $Ce_{0.8}Zr_{0.2}O_2$ | Cordierite | Mg, Al, Si, O | $1.8 \times 10^{-6}$ | 53 | 26 |
| Example 4 | Pd | $Zr_{0.7}Ce_{0.3}O_2$ | Mullite | Mg, Al, Si, O, Fe, Ti, Ca | $3.3 \times 10^{-6}$ | 36 | 15 |
| Example 5 | Rh | $Zr_{0.7}Ce_{0.3}O_2$ | SiC | Si, C | $6.5 \times 10^{-6}$ | 56 | 24 |
| Comparative Example 1 | Pd | — | Cordierite | Mg, Al, Si, O, Fe | $1.8 \times 10^{-6}$ | 53 | 0 |
| Comparative Example 2 | Rh | — | α-Alumina | Al | $8.1 \times 10^{-6}$ | 44 | 0 |

Example 1

A dinitrodiamine Pt solution was impregnated with and supported on $CeO_2$ so that a noble metal support concentration became 0.4 wt %, followed by drying and baking, whereby noble metal-supported first compounds of Example 1 were obtained.

Next, the noble metal-supported first compounds and polyvinylpyrrolidone (PVP) were put into an aqueous solution and milled, whereby dispersed slurry with an average particle diameter of 150 nm was obtained.

Meanwhile, slurry liquid, in which α-alumina with a primary particle diameter of 150 nm and $SiO_2$ with a primary particle diameter of 50 nm as a mullite raw material were milled, was prepared. The slurry liquid and the first compound-dispersed slurry were mixed, and a predetermined amount of cellulose as a porous-forming material and aluminum hydroxide as a binder were put into the mixed liquid, followed by drying, compressing and molding, and baking, whereby a catalyst structure of Example 4 was obtained.

In this case, the noble metal support concentration of the catalyst was 0.1 wt %, the content of the first compounds was 24.9 wt %, and the content of mullite was 75 wt %.

Also, the coefficient of linear thermal expansion of this catalyst body between 1000° C. to 1100° C. and the porosity measured by the Archimedean method were as shown in Table 1.

Example 5

A Rh nitrate solution was impregnated with and supported on $Zr_{0.7}Ce_{0.3}Ox$ so that a noble metal support concentration became 0.4 wt %, followed by drying and baking, whereby noble metal-supported first compounds of Example 5 were obtained.

Next, the noble metal-supported first compounds and polyvinylpyrrolidone (PVP) were put into an aqueous solution and milled, whereby dispersed slurry with an average particle diameter of 150 nm was obtained.

Meanwhile, slurry liquid in which $SiO_2$ with a primary particle diameter of 50 nm as a SiC raw material was milled was prepared. The slurry liquid and the first compound-dispersed slurry were mixed, and a predetermined amount of cellulose as a porous-forming material and as a C source of SiC, and $SiO_2$ sol as a binder were put into the mixed liquid, followed by drying, compressing and molding, baking in inactive gas once and further baking in atmospheric air, whereby a catalyst structure of Example 5 was obtained.

In this case, the noble metal support concentration of the catalyst was 0.1 wt %, the content of the first compounds was 24.9 wt %, and the content of SiC was 75 wt %.

Also, the coefficient of linear thermal expansion of this catalyst body between 1000° C. to 1100° C. and the porosity measured by the Archimedean method were as shown in Table 1.

Comparative Example 1

A cordierite structure was prepared, followed by impregnating and supporting Pd nitrate and baking at 400° C., whereby a catalyst structure of Comparative Example 1 was obtained.

Comparative Example 2

An α-alumina structure was prepared, followed by impregnating and supporting Rh nitrate, and a catalyst structure of Comparative Example 2 was obtained in a similar way to Comparative Example 1.

(Heat Resistance Evaluation of Catalyst)

The above-described catalyst bodies of Examples 1 to 5 and Comparative Examples 1 and 2 were baked at 1100° C. for five hours in atmospheric air, followed by calculating noble metal exposure surface areas by a CO adsorption method. The results are also shown in Table 1.

Examples 1 to 5 include the noble metal particles, the first compounds and the second compounds, in which the first compounds support the noble metal particles, single piece or aggregate of the first compounds supporting the noble metal particles are included in the section partitioned by the second compounds, and the coefficient of linear thermal expansion of the second compounds is $1.2 \times 10^{-5}$ $[K^{-1}]$ or less. Thus, as shown in Table 1, Examples 1 to 5 had excellent heat resistance to super high temperature even after the heat resistance test under super high temperature of 1100° C. while the noble metal capable of adsorbing CO was exposed sufficiently, and thus, catalytic activity could be maintained even under super high temperature.

Especially, compared with Example 2 and Example 3, Example 3 in which the porosity of the second compounds was 30% or more increased the noble metal exposure area more than Example 2 after the heat resistance test under super high temperature of 1100° C. Thus, further heat resistance improvement was proven when the porosity of the second compounds was 30% or more.

On the other hand, Comparative Examples 1 and 2 merely supporting the noble metal particles on the heat-resistant material did not include the noble metal capable of adsorbing CO since the noble metal particles were coagulated after the heat resistance test under super high temperature of 1100° C.

Example 6

(Catalyst Preparation for First Layer)

Zirconium/cerium composite oxide powder ($ZrO_2$: $CeO_2$=80:20) with an average particle diameter of 30 nm was used as the first compounds. Pd nitrate was impregnated with this powder so as to be the zirconium/cerium composite oxide powder supporting palladium (Pd) of 0.85% (the obtained powder is defined as the zirconium/cerium composite oxide powder A).

112.5 g (water content of 24%) of cuboidal boehmite (20 nm×20 nm×60 nm) was put in a beaker to disperse in water, and lanthanum nitrate was further added and dispersed so as to be 4.5 g of lanthanum oxide. 90 g of the preliminarily prepared zirconium/cerium composite oxide powder A was added to this liquid, and dispersed by high-speed agitation. Then, the obtained slurry was dried and baked, whereby powder a-1 partitioning the zirconium/cerium composite oxide powder A by alumina/lanthanum composite oxide was prepared.

168 g of the powder a-1, 7 g of boehmite alumina and 38.41 g of carbon black powder were added to a ball mill. Then, 307.5 g of water and 17.5 g of nitric acid aqueous solution of 10% were added to the ball mill, followed by milling the powder a-1 so as to obtain slurry with an average particle diameter of 3 μm (slurry a-1).

(Catalyst Preparation for Second Layer)

Rh nitrate was impregnated with zirconium/lanthanum composite oxide powder ($ZrO_2$:$La_2O_3$=97:3) with an average particle diameter of 20 nm so as to prepare the powder B supporting Rh of 0.814%.

112.5 g (water content of 24%) of cuboidal boehmite (20 nm×20 nm×60 nm) was put in a beaker to disperse in water, and lanthanum nitrate was further added and dispersed so as to be 4.5 g of lanthanum oxide. 90 g of the preliminarily prepared powder B was added to this liquid, and dispersed by high-speed agitation. Then, the obtained slurry was dried and baked, whereby powder b-1 partitioning the powder B by alumina/lanthanum composite oxide was prepared.

168 g of the powder b-1, 7 g of boehmite alumina and 38.41 g of carbon black powder were added to a ball mill. Then, 307.5 g of water and 17.5 g of nitric acid aqueous solution of 10% were added to the ball mill, followed by milling the powder b-1 so as to obtain slurry with an average particle diameter of 3 μm (slurry b-1).

(Formation on Substrate)

A honeycomb substrate (volume of 0.04 L) with a diameter of 36 mmΦ, 400 cells and 6 mil was coated with the slurry a-1 for the first layer, followed by drying and baking so as to obtain a catalyst layer coating 140 g/L (the first layer). Then, the honeycomb substrate was coated with the slurry b-1 for the second layer, followed by drying and baking so as to obtain a catalyst layer coating 60 g/L (the second layer). This was used for a sample of Example 6. The obtained sample of Example 6 is a catalyst supporting 0.571 g/L of Pd in the first layer and 0.234 g/L of Rh in the second layer, respectively.

Example 7

(Catalyst Preparation for First Layer)

Zirconium/cerium composite oxide powder ($ZrO_2$:$CeO_2$=80:20) with an average particle diameter of 30 nm was used as the first compounds. Palladium nitrate was impregnated with this powder so as to be the zirconium/cerium composite oxide powder supporting Palladium (Pd) of 0.85% (the obtained powder is defined as the zirconium/cerium composite oxide powder A).

85 g of silica powder with an average particle diameter of 25 nm was dispersed in water, and silica sol ($SiO_2$ of 20%) was further added and stirred so as to be 5 g of $SiO_2$. 90 g of the zirconium/cerium composite oxide powder A was added to this liquid, and dispersed by high-speed agitation. Then, the obtained slurry was dried and baked, whereby powder a-2 partitioning the zirconium/cerium composite oxide powder A by silica was prepared.

168 g of the powder a-2, 35 g of silica sol ($SiO_2$ of 20%) and 38.41 g of carbon black powder were added to a ball mill. Then, 297 g of water was added to the ball mill, followed by milling the powder a-2 so as to obtain slurry with an average particle diameter of 3 μm (slurry a-2).

(Catalyst Preparation for Second Layer)

Rhodium nitrate was impregnated with zirconium/lanthanum composite oxide powder ($ZrO_2$:$La_2O_3$=97:3) with an average particle diameter of 20 nm so as to prepare the powder B supporting rhodium of 0.814%.

85 g of silica powder with an average particle diameter of 25 nm was dispersed in water, and silica sol ($SiO_2$ of 20%) was further added and stirred so as to be 5 g of $SiO_2$. 90 g of the zirconium/lanthanum composite oxide powder B was added to this liquid, and dispersed by high-speed agitation. Then, the obtained slurry was dried and baked, whereby powder b-2 partitioning the zirconium/lanthanum composite oxide powder B by silica was prepared.

168 g of the powder b-2, 35 g of silica sol ($SiO_2$ of 20%) and 38.41 g of carbon black powder were added to a ball mill. Then, 297 g of water was added to the ball mill, followed by milling the powder b-2 so as to obtain slurry with an average particle diameter of 3 μm (slurry b-2).

(Formation on Substrate)

A honeycomb substrate (volume of 0.04 L) with a diameter of 36 mmΦ, 400 cells and 6 mil was coated with the slurry a-2, followed by drying and baking so as to obtain a catalyst layer coating 140 g/L (the first layer). Then, the honeycomb substrate was coated with the slurry b-2, followed by drying and baking so as to obtain a catalyst layer coating 60 g/L (the second layer). This was used for a sample of Example 7. The obtained sample of Example 7 is a catalyst supporting 0.571 g/L of Pd in the first layer and 0.234 g/L of Rh in the second layer, respectively.

Example 8

(Catalyst Preparation for First Layer)

Zirconium/cerium composite oxide powder ($ZrO_2$:$CeO_2$=80:20) with an average particle diameter of 30 nm was used as the first compounds. Palladium nitrate was impregnated with this powder so as to be the zirconium/cerium composite oxide powder supporting palladium of 0.85% (the obtained powder is defined as the zirconium/cerium composite oxide powder A).

85 g of mullite powder with an average particle diameter of 70 nm was dispersed in water, and boehmite was further added so as to be 5 g of $Al_2O_3$, followed by adjusting so as to be pH4 by nitric acid and stirring. 90 g of the zirconium/cerium composite oxide powder A was added to this liquid, and dispersed by high-speed agitation. Then, the obtained slurry was dried and baked, whereby powder a-3 partitioning the zirconium/cerium composite oxide powder A by mullite was prepared.

168 g of the powder a-3, 7 g of boehmite alumina and 38.41 g of carbon black powder were added to a ball mill. Then, 307.5 g of water and 17.5 g of nitric acid aqueous solution of 10% were added to the ball mill, followed by milling the powder a-3 so as to obtain slurry with an average particle diameter of 3 μm (slurry a-3).

(Catalyst Preparation for Second Layer)

Rhodium nitrate was impregnated with zirconium/lanthanum composite oxide powder ($ZrO_2$:$La_2O_3$=97:3) with an average particle diameter of 20 nm so as to prepare the powder B supporting rhodium of 0.814%.

85 g of mullite powder with an average particle diameter of 70 nm was dispersed in water, and boehmite was further added so as to be 5 g of $Al_2O_3$, followed by adjusting so as to be pH4 by nitric acid and stirring. 90 g of the zirconium/lanthanum composite oxide powder B was added to this liquid, and dispersed by high-speed agitation. Then, the obtained slurry was dried and baked, whereby powder b-3 partitioning the zirconium/lanthanum composite oxide powder B by mullite was prepared.

168 g of the powder b-3, 7 g of boehmite alumina and 38.41 g of carbon black powder were added to a ball mill. Then, 307.5 g of water and 17.5 g of nitric acid aqueous solution of 10% were added to the ball mill, followed by milling the powder b-3 so as to obtain slurry with an average particle diameter of 3 μm (slurry b-3).

(Formation on Substrate)

A honeycomb substrate (volume of 0.04 L) with a diameter of 36 mmΦ, 400 cells and 6 mil was coated with the slurry a-3, followed by drying and baking so as to obtain a catalyst layer coating 140 g/L (the first layer). Then, the honeycomb substrate was coated with the slurry b-3, followed by drying and baking so as to obtain a catalyst layer coating 60 g/L (the second layer). This was used for a sample of Example 8. The obtained sample of Example 8 is a catalyst supporting 0.571 g/L of Pd in the first layer and 0.234 g/L of Rh in the second layer, respectively.

Example 9

(Catalyst Preparation for First Layer)

Zirconium/cerium composite oxide powder ($ZrO_2$:$CeO_2$=80:20) with an average particle diameter of 30 nm was used as the first compounds. Palladium nitrate was impregnated with this powder so as to be the zirconium/cerium composite oxide powder supporting palladium (Pd) of 0.85% (the obtained powder is defined as the zirconium/cerium composite oxide powder A).

Zircon powder was added in water and milled by a beads mill, thereby preparing zircon slurry with an average particle diameter of 100 nm. The obtained slurry was put in a beaker so as to be 85 g of zircon, and silica sol ($SiO_2$ of 20%) was further added and stirred so as to be 5 g of $SiO_2$. 90 g of the zirconium/cerium composite oxide powder A was added to this slurry, and dispersed by high-speed agitation. Then, the obtained slurry was dried and baked, whereby powder a-4 partitioning the zirconium/cerium composite oxide powder A by zircon was prepared.

168 g of the powder a-4, 7 g of boehmite alumina and 38.41 g of carbon black powder were added to a ball mill. Then, 307.5 g of water and 17.5 g of nitric acid aqueous solution of 10% were added to the ball mill, followed by milling the powder a-4 so as to obtain slurry with an average particle diameter of 3 μm (slurry a-4).

(Catalyst Preparation for Second Layer)

Rhodium nitrate was impregnated with zirconium/lanthanum composite oxide powder ($ZrO_2:La_2O_3$=97:3) with an average particle diameter of 20 nm so as to prepare the powder B supporting rhodium of 0.814%.

Zircon powder was added in water and milled by a beads mill, thereby preparing zircon slurry with an average particle diameter of 100 nm. The obtained slurry was put in a beaker so as to be 85 g of zircon, and silica sol ($SiO_2$ of 20%) was further added and stirred so as to be 5 g of $SiO_2$. 90 g of the zirconium/lanthanum composite oxide powder B was added to this slurry, and dispersed by high-speed agitation. Then, the obtained slurry was dried and baked, whereby powder b-4 partitioning the zirconium/lanthanum composite oxide powder B by zircon was prepared.

168 g of the powder b-4, 7 g of boehmite alumina and 38.41 g of carbon black powder were added to a ball mill. Then, 307.5 g of water and 17.5 g of nitric acid aqueous solution of 10% were added to the ball mill, followed by milling the powder b-4 so as to obtain slurry with an average particle diameter of 3 μm (slurry b-4).

(Formation on Substrate)

A honeycomb substrate (volume of 0.04 L) with a diameter of 36 mmΦ, 400 cells and 6 mil was coated with the slurry a-4, followed by drying and baking so as to obtain a catalyst layer coating 140 g/L (the first layer). Then, the honeycomb substrate was coated with the slurry b-4, followed by drying and baking so as to obtain a catalyst layer coating 60 g/L (the second layer). This was used for a sample of Example 9. The obtained sample of Example 9 is a catalyst supporting 0.571 g/L of Pd in the first layer and 0.234 g/L of Rh in the second layer, respectively.

Example 10

(Catalyst Preparation for First Layer)

Zirconium/cerium composite oxide powder ($ZrO_2$:$CeO_2$=80:20) with an average particle diameter of 30 nm was used as the first compounds. Palladium nitrate was impregnated with this powder so as to be the zirconium/cerium composite oxide powder supporting palladium of 0.85% (the obtained powder is defined as the zirconium/cerium composite oxide powder A).

Cordierite powder was added in water and milled by a beads mill, thereby preparing cordierite slurry with an average particle diameter of 100 nm. The obtained slurry was put in a beaker so as to be 85 g of cordierite, and boehmite was further added so as to be 5 g of $Al_2O_3$, followed by adjusting so as to be pH4 by nitric acid and stirring. 90 g of the zirconium/cerium composite oxide powder A was added to this slurry, and dispersed by high-speed agitation. Then, the obtained slurry was dried and baked, whereby powder a-5 partitioning the zirconium/cerium composite oxide powder A by cordierite was prepared.

168 g of the powder a-5, 7 g of boehmite alumina and 38.41 g of carbon black powder were added to a ball mill. Then, 307.5 g of water and 17.5 g of nitric acid aqueous solution of 10% were added to the ball mill, followed by milling the powder a-5 so as to obtain slurry with an average particle diameter of 3 μm (slurry a-5).

(Catalyst Preparation for Second Layer)

Rh nitrate was impregnated with zirconium/lanthanum composite oxide powder ($ZrO_2:La_2O_3$=97:3) with an average particle diameter of 20 nm so as to prepare the powder B supporting Rh of 0.814%.

Cordierite powder was added in water and milled by a beads mill, thereby preparing cordierite slurry with an average particle diameter of 100 nm. The obtained slurry was put in a beaker so as to be 85 g of cordierite, and boehmite was further added so as to be 5 g of $Al_2O_3$, followed by adjusting so as to be pH4 by nitric acid and stirring. 90 g of the zirconium/lanthanum composite oxide powder B was added to this slurry, and dispersed by high-speed agitation. Then, the obtained slurry was dried and baked, whereby powder b-5 partitioning the zirconium/lanthanum composite oxide powder B by cordierite was prepared.

168 g of the powder b-5, 7 g of boehmite alumina and 38.41 g of carbon black powder were added to a ball mill. Then, 307.5 g of water and 17.5 g of nitric acid aqueous solution of 10% were added to the ball mill, followed by milling the powder b-5 so as to obtain slurry with an average particle diameter of 3 μm (slurry b-5).

(Formation on Substrate)

A honeycomb substrate (volume of 0.04 L) with a diameter of 36 mmΦ, 400 cells and 6 mil was coated with the slurry a-5, followed by drying and baking so as to obtain a catalyst layer coating 140 g/L (the first layer). Then, the honeycomb substrate was coated with the slurry b-5, followed by drying and baking so as to obtain a catalyst layer coating 60 g/L (the second layer). This was used for a sample of Example 10. The obtained sample of Example 10 is a catalyst supporting 0.571 g/L of Pd in the first layer and 0.234 g/L of Rh in the second layer, respectively.

Example 11

(Catalyst Preparation for First Layer)

Zirconium/cerium composite oxide powder ($ZrO_2$:$CeO_2$=80:20) with an average particle diameter of 30 nm was used as the first compounds. Dinitrodiamine Pt was impregnated with this powder so as to be the zirconium/cerium composite oxide powder supporting platinum (Pt) of 0.85% (the obtained powder is defined as the zirconium/cerium composite oxide powder C).

112.5 g (water content of 24%) of cuboidal boehmite (20 nm×20 nm×60 nm) was put in a beaker to disperse in water, and lanthanum nitrate was further added and dispersed so as to be 4.5 g of lanthanum oxide. 90 g of the preliminarily prepared zirconium/cerium composite oxide powder C was added to this liquid, and dispersed by high-speed agitation. Then, the obtained slurry was dried and baked, whereby powder a-6 partitioning the zirconium/cerium composite oxide powder C by alumina/lanthanum composite oxide was prepared.

168 g of the powder a-6, 7 g of boehmite alumina and 38.41 g of carbon black powder were added to a ball mill. Then, 307.5 g of water and 17.5 g of nitric acid aqueous solution of 10% were added to the ball mill, followed by milling the powder a-6 so as to obtain slurry with an average particle diameter of 3 μm (slurry a-6).

(Catalyst Preparation for Second Layer)

Rhodium nitrate was impregnated with zirconium/lanthanum composite oxide powder ($ZrO_2:La_2O_3$=97:3) with an average particle diameter of 20 nm so as to prepare the powder B supporting Rh of 0.814%. 112.5 g (water content of 24%) of cuboidal boehmite (20 nm×20 nm×60 nm) was put in a beaker to disperse in water, and lanthanum nitrate was further added and dispersed so as to be 4.5 g of lanthanum oxide. 90 g of the preliminarily prepared powder B was added to this liquid, and dispersed by high-speed agitation. Then, the obtained slurry was dried and baked, whereby powder b-1 partitioning the powder B by alumina/lanthanum composite oxide was prepared.

168 g of the powder b-1, 7 g of boehmite alumina and 38.41 g of carbon black powder were added to a ball mill. Then, 307.5 g of water and 17.5 g of nitric acid aqueous solution of 10% were added to the ball mill, followed by milling the powder b-1 so as to obtain slurry with an average particle diameter of 3 μm (slurry b-1).

(Formation on Substrate)

A honeycomb substrate (volume of 0.04 L) with a diameter of 36 mmΦ, 400 cells and 6 mil was coated with the slurry a-6, followed by drying and baking so as to obtain a catalyst layer coating 140 g/L (the first layer). Then, the honeycomb substrate was coated with the slurry b-1, followed by drying and baking so as to obtain a catalyst layer coating 60 g/L (the second layer). This was used for a sample of Example 11. The obtained sample of Example 11 is a catalyst supporting 0.571 g/L of Pt in the first layer and 0.234 g/L of Rh in the second layer, respectively.

[Comparative Example 3]

(Catalyst Preparation for First Layer)

Palladium nitrate was impregnated with cordierite powder so as to prepare the cordierite powder x-1 supporting palladium of 0.425%. 168 g of the powder x-1 and 7 g of boehmite alumina were added to a ball mill. Then, 307.5 g of water and 17.5 g of nitric acid aqueous solution of 10% were added to the ball mill, followed by milling the powder x-1 so as to obtain slurry with an average particle diameter of 3 μm (slurry x-1).

(Catalyst Preparation for Second Layer)

Rhodium nitrate was impregnated with cordierite powder so as to prepare the cordierite powder y-1 supporting rhodium of 0.407%. 168 g of the powder y-1 and 7 g of boehmite alumina were added to a ball mill. Then, 307.5 g of water and 17.5 g of nitric acid aqueous solution of 10% were added to the ball mill, followed by milling the powder y-1 so as to obtain slurry with an average particle diameter of 3 μm (slurry y-1).

(Formation on Substrate)

A honeycomb substrate (volume of 0.04 L) with a diameter of 36 mmΦ, 400 cells and 6 mil was coated with the slurry x-1, followed by drying and baking so as to obtain a catalyst layer coating 140 g/L (the first layer). Then, the honeycomb substrate was coated with the slurry y-1, followed by drying and baking so as to obtain a catalyst layer coating 60 g/L (the second layer). This was used for a sample of Comparative Example 3. The obtained sample of Comparative Example 3 is a catalyst supporting 0.571 g/L of Pd in the first layer and 0.234 g/L of Rh in the second layer, respectively.

[Comparative Example 4]

(Catalyst Preparation for First Layer)

Palladium nitrate was impregnated with α-alumina powder so as to prepare the α-alumina powder x-2 supporting palladium of 0.425%. 168 g of the powder x-2 and 7 g of boehmite alumina were added to a ball mill. Then, 307.5 g of water and 17.5 g of nitric acid aqueous solution of 10% were added to the ball mill, followed by milling the powder x-2 so as to obtain slurry with an average particle diameter of 3 μm (slurry x-2).

(Catalyst Preparation for Second Layer)

Rhodium nitrate was impregnated with α-alumina powder so as to prepare the α-alumina powder y-2 supporting rhodium of 0.407%. 168 g of the powder y-2 and 7 g of boehmite alumina were added to a ball mill. Then, 307.5 g of water and 17.5 g of nitric acid aqueous solution of 10% were added to the ball mill, followed by milling the powder y-2 so as to obtain slurry with an average particle diameter of 3 μm (slurry y-2).

(Formation on Substrate)

A honeycomb substrate (volume of 0.04 L) with a diameter of 36 mmΦ, 400 cells and 6 mil was coated with the slurry x-2, followed by drying and baking so as to obtain a catalyst layer coating 140 g/L (the first layer). Then, the honeycomb substrate was coated with the slurry y-2, followed by drying and baking so as to obtain a catalyst layer coating 60 g/L (the second layer). This was used for a sample of Comparative Example 4. The obtained sample of Comparative Example 4 is a catalyst supporting 0.571 g/L of Pd in the first layer and 0.234 g/L of Rh in the second layer, respectively.

[Comparative Example 5]

(Catalyst Preparation for First Layer)

Dinitrodiamine Pt was impregnated with aluminum titanate powder so as to prepare the aluminum titanate powder x-3 supporting Pt of 0.425%. 168 g of the powder x-3 and 7 g of boehmite alumina were added to a ball mill. Then, 307.5 g of water and 17.5 g of nitric acid aqueous solution of 10% were added to the ball mill, followed by milling the powder x-3 so as to obtain slurry with an average particle diameter of 3 μm (slurry x-3).

(Catalyst Preparation for Second Layer)

Rhodium nitrate was impregnated with aluminum titanate powder so as to prepare the aluminum titanate powder y-3 supporting rhodium of 0.407%. 168 g of the powder y-3 and 7 g of boehmite alumina were added to a ball mill. Then, 307.5 g of water and 17.5 g of nitric acid aqueous solution of 10% were added to the ball mill, followed by milling the powder y-3 so as to obtain slurry with an average particle diameter of 3 μm.

(slurry y-3).

(Formation on Substrate)

A honeycomb substrate (volume of 0.04 L) with a diameter of 36 mmΦ, 400 cells and 6 mil was coated with the slurry x-3, followed by drying and baking so as to obtain a catalyst layer coating 140 g/L (the first layer). Then, the honeycomb substrate was coated with the slurry y-3, followed by drying and baking so as to obtain a catalyst layer coating 60 g/L (the second layer). This was used for a sample of Comparative Example 5. The obtained sample of Comparative Example 5 is a catalyst supporting 0.571 g/L of Pt in the first layer and 0.234 g/L of Rh in the second layer, respectively.

(Heat Resistance Evaluation of Catalyst)

The prepared catalysts of Examples 6 to 11 and Comparative Examples 3 and 5 were baked at 1100° C. for five hours in air, thereby providing thermal history.

In addition, each catalyst after the heat resistance test was put in a simulated exhaust gas flow device to examine purification rates for HC, CO and NOx by flowing simulated exhaust gas having compositions shown in Table 2 in the simulated exhaust gas flow device and setting a catalyst temperature at 400° C.

The respective evaluation results of the catalyst of Examples 6 to 11 and Comparative Examples 3 and 5 were shown in Table 3.

TABLE 2

| Reactant Gas Composition | |
| --- | --- |
| NO | 1000 ppm |
| $O_2$ | 0.60% |
| $H_2$ | 0.20% |
| $HC(C_3H_6)$ | 1665 ppmC |
| CO | 0.60% |
| $CO_2$ | 15.50% |
| $H_2O$ | 10% |
| $N_2$ | Rest |

Space Velocity: SV = 60000/h

TABLE 3

| | First Layer | | | Second Layer | | |
| --- | --- | --- | --- | --- | --- | --- |
| | Noble Metal | First Compounds Material | Second Compounds Material | Noble Metal | First Compounds Material | Second Compounds Material |
| Example 6 | Pd | $ZrO_2$:$CeO_2$ (8:2) Composite Oxide | γ-Alumina/La Composite Oxide | Rh | $ZrO$:$La_2O_3$ (97:3) Composite Oxide | γ-Alumina/La Composite Oxide |
| Example 7 | Pd | $ZrO_2$:$CeO_2$ (8:2) Composite Oxide | Silica | Rh | $ZrO$:$La_2O_3$ (97:3) Composite Oxide | Silica |
| Example 8 | Pd | $ZrO_2$:$CeO_2$ (8:2) Composite Oxide | Mullite | Rh | $ZrO$:$La_2O_3$ (97:3) Composite Oxide | Mullite |
| Example 9 | Pd | $ZrO_2$:$CeO_2$ (8:2) Composite Oxide | Zircon | Rh | $ZrO$:$La_2O_3$ (97:3) Composite Oxide | Zircon |
| Example 10 | Pd | $ZrO_2$:$CeO_2$ (8:2) Composite Oxide | Cordierite | Rh | $ZrO$:$La_2O_3$ (97:3) Composite Oxide | Cordierite |
| Example 11 | Pt | $CeO_2$:$ZrO_2$ (7:3) Composite Oxide | γ-Alumina/La Composite Oxide | Rh | $ZrO$:$La_2O_3$ (97:3) Composite Oxide | γ-Alumina/La Composite Oxide |
| Comparative Example 3 | Pt | — | Cordierite | Rh | — | Cordierite |
| Comparative Example 4 | Pd | — | α-Alumina | Rh | — | α-Alumina |
| Comparative Example 5 | Pd | — | Aluminum Titanate | Rh | — | Aluminum Titanate |

| | Second Compounds | | | | | | |
| --- | --- | --- | --- | --- | --- | --- | --- |
| | Including Element | Coefficient of Linear Thermal Expansion ($K^{-1}$) | Porosity * (%) | BET Specific Surface Area ($m^2/g$) ** | *** | HC Purification Rate (%) | CO Purification Rate (%) | NOx Purification Rate (%) |
| Example 6 | Al, La, O | $1.2 \times 10^{-5}$ | 80 | 145 | 83 | 86 | 75 | 78 |
| Example 7 | Si, O | $0.5 \times 10^{-6}$ | 91 | 94 | 65 | 83 | 73 | 68 |
| Example 8 | Al, Si, O | $3.3 \times 10^{-6}$ | 78 | 50 | 29 | 82 | 72 | 68 |
| Example 9 | Zr, Si, O | $4.6 \times 10^{-6}$ | 71 | 8 | 7 | 81 | 71 | 67 |
| Example 10 | Al, Mg, Si, O | $1.8 \times 10^{-6}$ | 69 | 8 | 6 | 68 | 67 | 63 |
| Example 11 | Al, La, O | $1.2 \times 10^{-5}$ | 80 | 145 | 83 | 85 | 75 | 77 |
| Comparative Example 3 | Al, Mg, Si, O | $1.8 \times 10^{-6}$ | 69 | 8 | 6 | 3 | 2 | 2 |
| Comparative Example 4 | Al | $8.0 \times 10^{-6}$ | 61 | 14 | 8 | 4 | 3 | 3 |
| Comparative Example 5 | Ti, Al, O | $1.0 \times 10^{-6}$ | 51 | 1 | 0.4 | 2 | 1 | 1 |

* Porosity of Used Powder
** Room Temperature: Value before Heat Treatment
*** Value after Heat Treatment at 1000° C. for 5 Hours and thus, catalytic activity could be maintained even under super high temperature. Moreover, the BET specific surface areas of the enveloping materials show good results that are 5 $m^2/g$ or more after the treatment at 1000° C. for five hours. In addition, the purification rates in the compounds including Al, Si, La and Zr are good.

In these Examples 6 to 11, the noble metal was exposed sufficiently, thus it is considered that the catalytic activity could be maintained even under super high temperature.

On the other hand, Comparative Examples 3 and 5 merely supporting the noble metal particles on the heat-resistant material could not obtain catalytic activity after the heat resistance test under super high temperature of 1100° C. This can be because the activity was lost due to coagulation of the noble metal. Comparative Example 5, which is an example in which aluminum titanate was used as the second compounds, lost catalytic activity under super high temperature since the BET specific surface area was less than 5 $m^2/g$ after the treatment at 1000° C.

The entire contents of a Japanese Patent Application No. P2007-112311 filed with Japan Patent Office on Apr. 20, 2007, and a Japanese Patent Application No. P2008-048166 filed on Feb. 28, 2008 are herein incorporated by reference.

Examples 6 to 11 include the noble metal particles, the first compounds and the second compounds, in which the first compounds support the noble metal particles, single piece or aggregate of the first compounds supporting the noble metal particles are included in the section partitioned by the second compounds, and the coefficient of linear thermal expansion of the second compounds is $1.2 \times 10^{-5}$ [$K^{-1}$] or less according to the present invention. These examples had excellent heat resistance to super high temperature even after the heat resistance test under super high temperature of 1100° C. while showing good purification performance for HC, CO, NOx, The description has been made above of the embodiments to which the invention made by the inventors is applied; however, the present invention is not limited by the description and the drawings, which are in accordance with the embodiments and form a part of the disclosure of the present invention. Specifically, it is additionally noted here that it is a matter of course that other embodiments, examples, application technologies, and the like, which are made by those skilled in the art, and the like based on the above-described embodiments, are entirely incorporated in the scope of the present invention.

The invention claimed is:

1. A high heat-resistant catalyst, comprising:
noble metal particles;
first compounds which are particulate compounds including at least one of Ce and Zr, support the noble metal particles, and suppress movement of the noble metal particles; and
second compounds which envelop both of the noble metal particles and the first compounds, suppress the movement of the noble metal particles, and suppress coagulation of the first compounds following mutual contact of the first compounds, the second compounds comprising a ceramics selected from the group consisting of cordierite, mullite, SiC, α-alumina and silica,
wherein a single piece or aggregate of the first compounds supporting the noble metal particles are included in a section partitioned by the second compounds, and
a coefficient of linear thermal expansion of the second compounds is $1.2 \times 10^{-5}$ [$K^{-1}$] or less.

2. The high heat-resistant catalyst according to claim 1, wherein a porosity of the second compounds is 30% or more.

3. The high heat-resistant catalyst according to claim 1, wherein a BET specific surface area of the second compounds is 5 m²/g or more after a heat treatment at 1000° C. for five hours.

4. The high heat-resistant catalyst according to claim 1, wherein a coefficient of linear thermal expansion of the second compounds is $2.0 \times 10^{-6}$ [$K^{-1}$] or less.

5. The high heat-resistant catalyst according to claim 1, wherein the noble metal particles comprises one selected from the group consisting of Pt, Pd and Rh.

6. The high heat-resistant catalyst according to claim 1, wherein a porosity of the second compounds is between 29-91%.

7. A manufacturing method of the high heat-resistant catalyst according to claim 1, the method comprising:
preparing first compounds supporting noble metal particles, followed by milling them; and
after the milling, forming second compounds on peripheries of the first compounds.

8. The manufacturing method of the high heat-resistant catalyst according to claim 1, the method comprising:
preparing catalyst powder; and
providing the catalyst powder on an inner surface of a substrate,
wherein the preparing comprises:
supporting noble metal on first compounds;
milling and slurrying second compounds; and
dispersing the first compounds supporting the noble metal into slurry of the second compounds, followed by drying and baking so as to obtain the catalyst.

* * * * *